Nov. 22, 1966     H. R. THOMAS     3,286,757
PNEUMATIC TIRE AND WHEEL ASSEMBLY
Filed Oct. 31, 1962

INVENTOR.
HAROLD R. THOMAS
BY
*J. B. Holden*
ATTORNEY

United States Patent Office 3,286,757
Patented Nov. 22, 1966

3,286,757
PNEUMATIC TIRE AND WHEEL ASSEMBLY
Harold R. Thomas, Cuyahoga Falls, Ohio, assignor to The Goodyear Tire & Rubber Company, Akron, Ohio, a corporation of Ohio
Filed Oct. 31, 1962, Ser. No. 234,441
13 Claims. (Cl. 152—330)

This invention relates to pneumatic tire and wheel assemblies wherein the inside of the tire and that portion of the rim between the beads of the tire forms an air chamber for inflating the tire and where the rim has been treated to render it impervious to air. More specifically, this invention relates to a method of sealing the rim portion of a wheel whereby the wheel can be used with a pneumatic tire without a tube.

Wire wheel tires are a luxury item and are only used with sports cars and other expensive models. It has been desirable for some time to use these wheels with tubeless tires as this would permit certain savings. The wire spokes permit the leakage of air. Hence, this has not been satisfactorily accomplished. Also, it has been desirable to make wheels by stamping out a plurality of circular members including a supporting portion and a rim section on the periphery thereof and then assembling these circular members to form a wheel containing a rim. Normally these circular members are assembled by bolting or welding the various members together. Wheels made in this manner have not been satisfactorily used with tubeless tires because the rims permitted the passage of air.

Therefore a principal object of this invention is to provide a method of sealing the rims of wheels of these types whereby the resulting wheel can be used with a tubeless tire. Another object is to provide a new tubeless pneumatic tire and wheel assembly. Other objects and advantages will become evident from the description and the drawings wherein FIG. 1 is a partial vertical section through a pneumatic tire and wire wheel assembly and FIG. 2 is a vertical section through a pneumatic tire and wheel assembly wherein the wheel is composed of a plurality of circular members.

Figure 1:
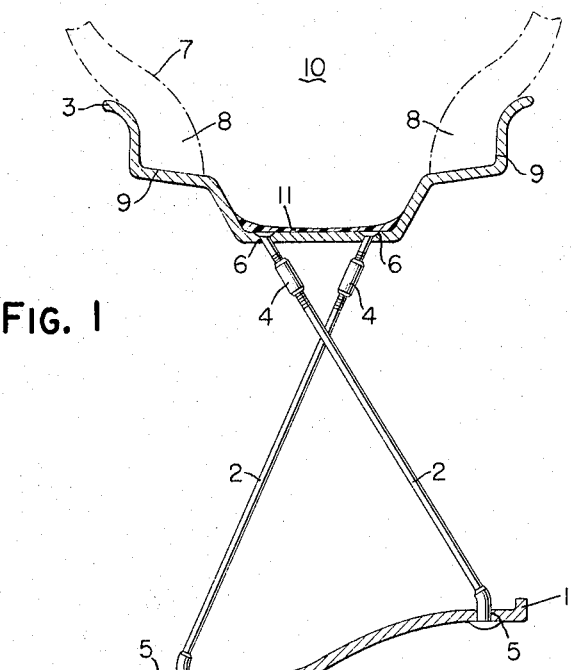

By reference to FIG. 1 it is evident that numeral 1 represents the hub and numeral 2 represents the metal spokes connecting the hub with the drop center rim 3. The spokes are welded or bolted to the hub and are either welded or bolted to the rim as shown by the respective numerals 5 and 6. The tension on the spokes can be varied by adjusting the adjusting means 4. The rim has a pneumatic tire 7 seated thereon with the bead portions 8 in contact with the shoulder portions 9 and thereby forms an air chamber 10 between the inside surface of the pneumatic tire and that portion of the rim between the bead seats 8. The portions of the rims around the ends of the metal spokes have been sealed with a coating 11 of a polyurethane compound and thus the air chamber is rendered impervious.

Figure 2:
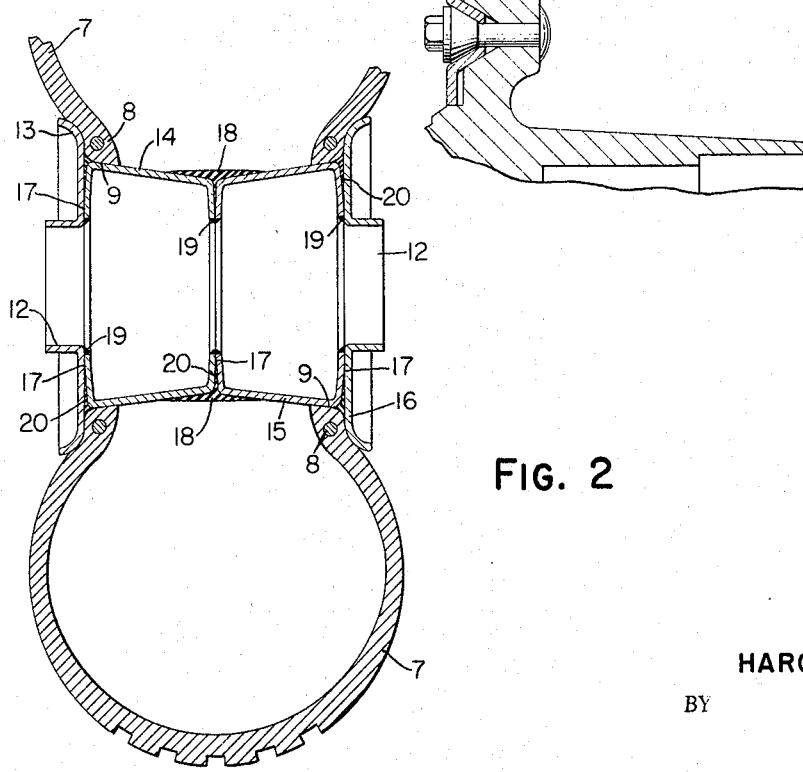

Referring to FIG. 2, numeral 12 is the hub member and numerals 13, 14, 15 and 16 refer to the circular members which have been assembled to form a wheel by welding at the points 19 along the joints 17 thereof. A wheel assembled in this manner has air passages therein and these air passages have been sealed by the application of a sealing coat 18 of polyurethane which may extend down in the joint 17 to the weld as shown by numeral 20. A pneumatic tubeless tire 7 having beads 8 is shown seated on the shoulders 9 of the wheel. It should be apparent from FIG. 2 that the circular section 13 is essentially a mirror image of the member 16 and likewise member 14 is a mirror image of member 15. Also it should be apparent that the number of circular members may be more than shown in FIG. 2 or reduced to as few as 2.

The polyurethane seal coatings may be applied by brushing or otherwise applying a liquifiable polyurethane reaction mixture to the surface of the rim which has been cleaned by sand blasting or other well-known means, and then reacting the reaction mixture to effect the cure of the polyurethane composition.

It has been found desirable under certain atmospheric conditions to use a preliminary coat of an adhesive to enhance the bond between the polyurethane composition and the metal. A suitable adhesive for achieving this enhancement of the bond between the polyurethane and the metal is a mixture of (a) a rubbery polymer of a conjugated diene or copolymers, for instance, from about 30 to 85% by weight of styrene and from 70 to 15% by weight of acrylonitrile, and (b) polyisocyanates and mixtures thereof having the formula

$$OCN-R-(CY_2-R'-NCO)_n$$

in which R and R' are arylene radicals, Y is selected from the group consisting of hydrogen, alkyl and aryl radicals and $n$ is a whole number. The preferred cements are made with mixture of polyisocyanates containing at least 10 to 20% of a triisocyante having the above formula. The cements comprised of (a) and (b) parts above are preferably applied as a first and second coat with sufficient time being allowed between first and second coats for at least part of the solvent to evaporate.

Other suitable and representative cements are illustrated in the examples.

Any of the polyester, polyesteramides and polyethers suitable for making polyurethane castings may be used either as is or by suitable modifications to prepare a sprayable polyurethane composition. In general the polyesters are preferred over the polyethers for the preparation of these spray coating polyurethane compositions. This preference is based primarily upon the fact the polyesters produce coatings of greater strength and solvent resistance than the polyethers.

Representative examples of the polyesters useful in this invention are the condensation products of a glycol with an organic dicarboxylic acid or anhydride having a molecular weight of about 700 to 5000 and preferably from 1000 to 3000. Representative glycols are ethylene, propylene, butylene, pentylene, decamethylene, etc. Representative examples of the organic dicarboxylic acids or their anhydrides are succinic, glutaric, adipic, phthalic, terephthalic, isophthalic, suberic, sebacic, pimelic, and azelaic. Also, small amounts, i.e., 1 to 20% or more, of certain tri- or higher functional polyols and polyacids can be used to produce a small amount of branching in the polymeric material. Castor oil may be used in small amounts, too.

The prepolymers of this invention may be prepared from reactive hydrogen containing polymeric materials (hereinafter sometimes referred to in a more restricted sense as polymeric glycols or polyols) and an organic polyisocyanate by the procedures well known to the art. Any of a wide variety of polymeric glycols having a molecular weight of from 500 to 10,000 may be used. Of the polymers prepared from polyalkylene ether glycols, the polytetramethylene ether glycols are preferred. It is to be understood that other polyols such as polyalkylene-arylene ether glycols or triols, polyalkylene ether-thioether glycols or triols and polyester glycols, including alkyd resins, may be used.

In the preparation of the isocyanate-terminated polymers, a molar excess of a polymeric polyol such as a polyalkylene ether glycol or polyester glycol are first reacted with an organic diisocyanate to prepare a polyurethane glycol which may subsequently be reacted with a molar excess of an organic diisocyanate so as to prepare an isocyanate-terminated polymer. Alternatively, the polymeric glycol may be reacted directly with a molar excess of an organic diisocyanate. In the preparation of these polymers, overall molar ratios of organic diisocyanate to polymeric polyol of between 1.1:1 and 12:1 should be used at temperatures ranging from about 20 to about 150° C. The preferred ratios are about 1.2:1 to 2:1.

Any of a wide variety of organic diisocyanates may be employed for the preparation of the isocyanate-terminated polymer, including aromatic, aliphatic and cycloaliphatic diisocyanates and combinations of these types. Representative compounds include toluene-1,4-diisocyanate; mixtures of toluene-2,4- and -2,6-diisocyanates; m-phenylene diisocyanate; 4-chloro-1,3-phenylene diisocyanate; 4,4'-biphenylene diisocyanate; 1,5-naphthylene diisocyanate; 1,4-tetramethylene diisocyanate; 1,6-hexamethylene diisocyanate; 1,10-decamethylene diisocyanate; 1,4-cyclohexylene diisocyanate; 4,4'-methylene-bis (cyclohexyl isocyanate) and 1,5-tetrahydronaphthylene diisocyanate. For purposes of the present invention, the toluene-diisocyanates; diphenylmethane-4,4'-diisocyanate and 3,3'-dimethyl-4,4'-bis-phenylene diisocyanate are preferred and these respective diisocyanates are sometimes hereinafter referred for convenience as TDI, MDI, and TODI.

These prepolymers are dissolved or dispersed in suitable solvents hereinafter described and then are mixed with a crosslinking agent which preferably is dissolved or dispersed in a suitable solvent. The amount of solvent used for preparing the dispersion of the prepolymer or mixtures of polymeric polyols and polyisocyanate and the crosslinking agent are determined primarily by the viscosity desired in the mixture and the nature of the spraying equipment in which the mixture is to be used. If high pressure spray equipment is used, the amount of solvent required may be less as higher viscosities can be tolerated. Hence, the solid content of the reaction mixture may be very high and contain only a few percent solvent. The crosslinking agent may be a material containing three or more reactive groups, e.g. glycerol or triethanolamine, but bifunctional materials are preferred. In general, the bifunctional materials yield products having superior spraying properties. Representative classes of compounds suitable for use as crosslinking agents are the glycols, the diamines having primary or secondary amino groups, the dicarboxylic acids, the hydroxy amines, the hydroxy-carboxylic-acids and the amino-carboxylic acids. Representative examples of suitable compounds belonging to these classes are those glycols having a molecular weight less than about 250 such as ethylene glycol; 1,3-propane-diol and 1,4-butane-diol as the diamines such as ethylene diamine; trimethylene diamine; tetramethylene diamine; m-phenylene diamine; o- and m-dichlorobenzidine; 2,5-dichlorophenylene diamine; 3,3'-dichloro-4,4'-diamine-diphenyl methane; dianisidine; 4,4'-diamino-diphenyl-methane; naphthylene diamines; tolylene-2,4-diamine; p-aminobenzyl aniline; o- or p-aminodiphenyl-amine; 2-aminoethyl alcohol; 2-amino-1-naphthol; m-aminophenol; glycollic acid; alpha-hydroxy propionic acid; amino acetic acid and amino benzoic acid. The preferred glycol crosslinker is butane diol and the chloro-arylene diamines such as ortho dichlorobenzidine and methylene bis orthochloroaniline are the preferred amine crosslinkers. The respective chloroarylene diamines above are sometimes referred to herein for convenience as ODCB and MOCA.

A method for selecting the diisocyanates and diamines which form sprayable liquid reaction mixtures that can be mixed and used with a single container-type spray gun is the boiling methylene chloride turbidity test. By this method semimolar solutions of the diisocyanate and diamine are made with methylene chloride. The respective methylene chloride solutions of diisocyanate and diamine are raised to the boiling temperature and mixed. If a turbidity develops inside of 25 to 30 seconds, this combination of diisocyanate and diamine will not yield a reaction mixture which can be sprayed under normal conditions. Thus, special spray conditions are required, for instance, very low temperatures or a spray gun containing a mixing head must be used. On the other hand, those mixtures of diisocyanate and diamine which do not produce a turbidity inside of about 25 to 50 seconds can be sprayed with normal spray conditions. Some combinations especially well suited for use in this invention are

TDI—MOCA
TDI—ODCB
TDI—APS [1]
TODI—MOCA
TODI—ODCB
TODI—APS
MDI—MOCA
MDI—ODCB

Naphthalene diisocyanate—MOCA
Naphthalene diisocyanate—ODCB
Naphthalene diisocyanate—APS
4,4'-diphenyl diisocyanate—MOCA
4,4'-diphenyl diisocyanate—ODCB
4,4'-diphenyl diisocyanate—APS

[1] APS is bis(3,3'-amino phenyl) sulfone.

Any of the non-reactive solvents normally used in making paints which are suitable for spraying may be used in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, Cellosolve propylate, Cellosolve acetate butyrate, dioxane, etc. Mixtures of certain solvents in particular amounts may be desirable to obtain satisfactory spreading properties and evaporation rates when the polyurethane spray composition is applied to a surface. This is especially true where very volatile solvents such as benzene and acetone are used.

Also it is desirable to add to the spray composition certain pigments and other additives such as surface active agents, leveling agents, for instance, cellulose acetate butyrate, and other additives well known to the spray coating art. In particular, it is desirable to add about 0.5 to 5 parts and preferably about 1 to 2 parts of a pigment such as carbon black or other dark pigment on a hundred parts of prepolymer basis to increase the ultraviolet resistance.

The addition of from 1 to about 30 parts of a leveling agent per hundred parts of prepolymer to the solvent or the solvent mixture of the prepolymer or the solvent mixture of the crosslinking agent results in the sprayed surface having a satin smooth finish. The addition of a leveling agent also results in the sprayed surface being free of peaks or projections that cause the finished article to contain pinholes. Where the sprayed coat is not satin smooth and contains peaks and projections, holes are frequently obtained in the first spray coat. These holes have to be patched and thereby increase cost of sealing the wheel rim.

Submicroscopic pyrogenic silica such as prepared in a hot gaseous environment by the vapor phase hydrolysis of silicon tetrachloride and available from Godfrey L. Cabot, Inc. under the trademark Cab-o-sil is especially useful as a leveling agent in the sprayable polyurethane compositions when used in about 0.1 to 10 parts per 100 parts of solids in the solution. The preferred amount is about 0.5 to about 4 parts as the amount of solvent needed to give a sprayable viscosity is not materially changed. Also, this range of pyrogenic silica gives good thixotropic properties to the resulting sprayable composition.

EXAMPLE I

The polyurethane liquid reaction mixture used in this example was prepared from a prepolymer. This prepolymer was prepared by reacting 2 mols of toluene diisocyanate with 1 mol of a polyester prepared by the condensation of adipic acid with an excess of a mixture consisting of 80% by weight ethylene glycol and 20% by weight propylene glycol. This prepolymer was used to prepare a black masterbatch by ball milling 1250 parts of this prepolymer with 375 parts Cellosolve acetate, 125 parts carbon black and 375 parts of methyl ethyl ketone. The ball milling was continued until a uniform suspension was obtained.

Component 1 of the spray mixture was formed by mixing 165 parts of this black masterbatch with a mixture consisting of 1500 parts of the prepolymer, 450 parts Cellosolve acetate, 450 parts methyl ethyl ketone and 72 parts of a solution of cellulose acetate butyrate containing 10% by weight of a mixture containing 50% xylene and 50% methyl Cellosolve acetate. Component 2 of this sprayable mixture comprises 153 parts of methylene-bis-ortho-chloroaniline and 153 parts of methyl ethyl ketone. Components 1 and 2 were mixed just prior to the time the spray coats were to be applied to the wheel rim to form the sprayable polyurethane liquid reaction mixture. Normally the mixture of components 1 and 2 remained sprayable in excess of one hour. The sprayable polyurethane liquid reaction mixture was sprayed on the face of the rim as the wheel was rotated under sun lamps to hasten the curing of the spray coat. The spraying was continued until the holes around the wire spoke ends were filled. This wheel was then fitted with a tubeless pneumatic tire and run for several thousand miles without loss of inflation.

EXAMPLE II

Another two-component spray recipe satisfactory for sealing the wheel rims in accordance with the procedure for Example I is given below:

*Component #1*

| Ingredient: | Parts |
| --- | --- |
| Prepolymer | 63 |
| Cellosolve acetate | 18.5 |
| Methyl ethyl ketone | 18.5 |
| Cellulose acetate butyrate | 0.4 |
| Lampblack | 1.0 |

*Component #2*

| Ingredient: | |
| --- | --- |
| Diamine | 1 |
| Methyl ethyl ketone | 1 |

The following prepolymers were used in the formulation of Component #1 of this example:

PREPOLYMER A

A reaction product of 2 mols of tolylene diisocyanate with about 1 mol of a polyester formed by condensing an excess of ethylene glycol with adipic acid.

PREPOLYMER B

Same as Prepolymer A except the mol ratio used was 1.1 to 1.

PREPOLYMER C

Same as Prepolymer A except propylene glycol was used to produce the polyester.

PREPOLYMER D

Same as Prepolymer A except methylene diphenylene diisocyanate was used instead of toluene diisocyanate.

PREPOLYMER E

The same as Prepolymer C except methylene diphenylene diisocyanate was used instead of toluene diisocyanate.

PREPOLYMER F

The reaction product of 2 mols of toluene diisocyanate with 1 mol of a poly tetramethylene ether glycol having a molecular weight of about 3000.

Each of the Prepolymers A through F were used to make Component 1. Then each of these Component 1 mixes were combined with a Component 2 mix where methylene-bis-orthochloroaniline and orthodichlorobenzidine was the diamine used to make Component 2. Each of these resulting mixes of Components 1 and 2 were then used to seal the rim of a wire spoke wheel according to the procedure of Example I.

A preferred spray composition for sealing the rim of a wire spoke wheel is illustrated in the following example as this sprayable polyurethane composition offers the advantage of reducing the number of spray coats of polyurethane.

EXAMPLE III

A masterbatch was prepared by ball milling the following ingredients:

| | Parts |
| --- | --- |
| Prepolymer [1] | 2000 |
| Cellosolve acetate | 600 |
| Methyl ethyl ketone | 600 |
| Cellulose acetate butyrate | 80 |
| Cab-o-sil | 50 |
| High abrasion furnace black | 20 |

[1] This prepolymer can be any of those from Example 2 bearing letters A through F.

This masterbatch was used as Component 1 of the liquid reaction mixture. Component 2 of this liquid reaction mixture, which consisted of 192 parts of methylene bis orthochloroaniline dissolved in 192 parts of methyl ethyl ketone, was mixed with Component 1 and used to spray a rim of a wheel of the type shown in FIG. 2 in accordance with the technique of Example 1.

Since the Cab-o-sil permitted thicker spray coats to be built up without flow or sag occurring, the number of spray coats required was reduced. When using this formulation an interlayer thickness of 10 to 25 mils was easily laid down in two spray coats.

From the above example, it should be evident that the use of finely divided pulverulent silicon dioxide permits sprayed layers of 30 to 75 mils in thickness to be built up with a very few spray coats. In fact, structures up to 200 mils may be readily built up.

The sprayable polyurethane compositions of this invention have thus far been described as comprising a prepolymer, a solvent, a cross-linking agent and certain other additive agents. Although the embodiments described previously herein illustrate the best method of accomplishing this invention, those skilled in the art would realize that a sprayable reaction mixture comprising a reactive hydrogen containing polymeric material and an organic diisocyanate or even a mixture of diisocyanates and triisocyanates in sufficient solvent can be mixed and then sprayed immediately, if desired, upon the rim. Then in a very short time the spray coat will react to form the prepolymer in situ on the rim. Hence, the prepolymer which now forms the coating can be crosslinked by exposure to an atmosphere which contains vapors such as those of water, diamine or glycol to produce a polyurethane composition of a nature simulating that obtained by the previously described embodiments. Also, it should be appreciated that the nature of this spray coat can be varied by prolonging the time between spray coats and the nature of the vapor content of the atmosphere to which the rim of the wheel containing the spray coat is exposed prior to final cure. It should be further appreciated that the tensile strength of a seal coat made in this manner may be as much as a thousand pounds per square inch, less than the ones obtained by the procedure of Example 1.

It is not necessary to form a sprayable polyurethane to seal the rims since a liquid reaction mixture can be used per se as is illustrated in Example VI.

EXAMPLE VI

A suitable liquid reaction mixture for sealing the rim of a wire spoke wheel was made by the use of a hundred parts of a polyethylene adipate of about 2000 molecular weight, 23 parts 3,3'-dimethyldiphenyl, 4,4'-diisocyanate and 6 parts of ortho dichlorobenzidine. Any water present in the polyethylene adipate was removed by holding the polyethylene adipate at about 250°F. under a vacuum for about 1 or 2 hours. Then the diisocyanate is added to the polyester and allowed to react to form a prepolymer. Then the orthodichlorobenzidine was stirred rapidly into the prepolymer and the resulting liquid reaction mixture was immediately brushed on to the surface of the rim of a wire spoked wheel. This rim previously had been cleaned by sand blasting and had been coated with a first coat of an epoxy resin in a hydrocarbon solution of a polydiene rubber and then with a second coat of a polyaryl polyisocyanate to enhance the adhesion between the polyurethane and the metal surface. Sufficient polyurethane reaction mixture was brushed on to the surface of the rim to give a coat from about one-thirty-second of an inch to about one-eighth of an inch in thickness. The temperature of the wheel can be either ambient or elevated at the time the reaction mixture is applied but usually it is desirable to apply it at about 100°F. or higher. The wheel containing the polyurethane coating was then held at about 250° F. for 24 hours. Then a pneumatic tire of the tubeless type was mounted on the wire wheel and was inflated with air. This wheel and tire assembly was run on a car for a period of eight months without loss of air.

Instead of the above formulation another polyurethane was made wherein methylene bis ortho chloroaniline was used instead of ortho dichlorobenzidine to cure the prepolymer of this example. The rim of a wheel of the type shown in FIG. 2 was then treated with this liquid reaction mixture and cured in an oven at 250° F. for several hours. The seal on another rim was cured at ambient temperature but faster cures are obtained at temperatures of about 100° F. and preferably higher. A pneumatic tire was then mounted on this wheel and it has been used on a wheelbarrow for several months without loss of inflation.

The rim of another wheel of the FIG. 2 type was coated with a liquid reaction mixture comprising 1 mol of a poly tetramethylene ether glycol of about 2000 molecular weight, 1.7 mols of tolylene diisocyanate and about 0.5 mol of 1,4-butane diol. Then the coated rim was cured at 250° F. for 24 hours. A pneumatic tubeless tire was then mounted on this wheel and used without loss of inflation.

While certain representative embodiments and details have been shown for the purpose of illustrating the invention, it will be apparent to those skilled in this art that various changes and modifications may be made therein without departing from the spirit or scope of the invention.

What is claimed is:

1. A method of treating the rim of a rim wheel assembly to render at least that portion of the rim which forms an air chamber with the inside of a pneumatic tire which has its beads in contact with the shoulder of said rim impervious to air comprising the steps of
   (1) cleaning the surface of that portion of the rim forming said air chamber;
   (2) applying to the clean surface of the rim a liquifiable reaction mixture comprising
       (a) a reactive hydrogen containing polymeric material having a molecular weight from about 500 to 10,000;
       (b) a polyisocyanate in at least about 1 mol for each mol of polymeric material, and
       (c) a curing agent for the reactants (a) and (b), and
   (3) reacting the ingredients of the reaction mixture to cure said mixture and thereby obtain a seal coat on that portion of the rim.

2. The method of claim 1 wherein the curing agent is selected from the class consisting of the glycols having a molecular weight less than about 250 and the chloroarylene diamines.

3. The method of claim 1 wherein the curing agent is ortho dichlorobenzidine.

4. The method of claim 1 wherein the curing agent is methylene bis ortho chloroaniline.

5. The method of claim 2 wherein the reactive hydrogen containing polymeric material is selected from the hydroxyl terminated polyesters and polyethers.

6. The method of claim 5 wherein the rim surface has a temperature of at least about 100° F. when the liquifiable reaction mixture is applied.

7. The method of claim 6 wherein the rim and the applied liquid reaction mixture are held at a temperature in excess of 100° F. for several hours to cure the polyurethane.

8. A method of treating the rim of a rim wheel assembly to render at least that portion of the rim which forms an air chamber with the inside of a pneumatic tire which has its beads in contact with the shoulder of said rim impervious to air which comprises the steps of
   (1) cleaning the surface of that portion of the rim forming said air chamber;
   (2) applying a first coat of a solution of an epoxy compound in a hydrocarbon solvent cement of a rubbery polymer of a conjugated diene to the surface of the rim to be sealed and then drying to remove at least part of the solvent;
   (3) applying a second coating of an organic polyisocyanate containing at least 20% of a trifunctional isocyanate;
   (4) applying to the coating of step 3 a liquifiable reaction mixture comprising
       (a) a reactive hydrogen containing polymeric material having a molecular weight from about 500 to 10,000;
       (b) a polyisocyanate in at least about 1 mol for each mol of polymeric material, and
   (5) reacting the ingredients of the reaction mixture to cure said mixture and thereby obtain a seal coat on that portion of the rim.

9. In combination a tubeless tire inflated on the rim of a wire spoked wheel, said rim containing a sealing coat of a polyurethane composition over at least the ends of each of said spokes, said polyurethane composition resulting from the reaction and curing of a liquid reaction mixture in contact with the rim where said reaction mixture is comprised of a reactive hydrogen containing polymeric material of about 500 to 10,000 molecular weight selected from the class consisting of the hydroxyl terminated polyesters and polyethers and an organic polyisocyanate and a crosslinking agent selected from the class consisting of the glycols and the diamines.

10. The combination of claim 9 wherein the seal coat has a thickness of one-thirty-second to one-eighth of an inch.

11. A pneumatic tire and wheel assembly having the beads of the tire in contact circumferentially with the shoulders of the rim whereby the tire and the portion of the rim between the beads thereof forms an air chamber for inflating the tire, said portion of the rim between the rim shoulders being sealed against loss of air, said seal resulting from the reaction and curing of a liquifiable reaction mixture in contact with the surface of the rim where the liquifiable reaction mixture comprises
   (a) a reactive hydrogen containing polymeric material having a molecular weight from about 500 to 10,000;
   (b) a polyisocyanate in at least about 1 mol for each mol of polymeric material, and
   (c) a curing agent for the reactants (a) and (b) and which has been reacted and cured in contact with the rim.

12. The assembly of claim 11 wherein the wheel is comprised of a plurality of circular members including a supporting portion and the rim section on the periphery thereof.

13. The assembly of claim 11 wherein the rim is supported by spokes projecting outward from the hub.

References Cited by the Examiner
UNITED STATES PATENTS

| | | | |
|---|---|---|---|
| 2,847,050 | 8/1958 | Burke | 152—404 |
| 2,879,825 | 3/1959 | Bottasso | 152—404 |
| 2,910,381 | 10/1959 | Vogel | 152—404 |
| 3,008,770 | 11/1961 | Mueller | 301—97 |
| 3,074,911 | 1/1963 | Harper | 117—132 X |

FOREIGN PATENTS 339,518    8/1959    Switzerland.

OTHER REFERENCES

Bayer, Modern Plastics, June 1947, pp. 149–152, 250, TP 986.A1 M6.

Preuss, Metal Finishing, March 1963, pp. 71–75, PS 200.M587.

ALFRED L. LEAVITT, *Primary Examiner.*

JOSEPH B. SPENCER, MURRAY KATZ, *Examiners.*

R. S. KENDALL, *Assistant Examiner.*